United States Patent
Strauel

[19]

[11] Patent Number: 5,925,256
[45] Date of Patent: Jul. 20, 1999

[54] METHOD FOR ELIMINATING IRON FROM A PHOTOGRAPHIC EFFLUENT

[75] Inventor: Philippe Strauel, Givry, France

[73] Assignee: Eastman Kodak Company, Rochester, N.Y.

[21] Appl. No.: 08/936,561

[22] Filed: Sep. 24, 1997

Related U.S. Application Data

[30] Foreign Application Priority Data

Sep. 25, 1996 [FR] France .................................. 96 11961

[51] Int. Cl.$^6$ ...................................................... C02F 1/64
[52] U.S. Cl. .......................... 210/724; 210/725; 210/726; 210/727; 210/912; 423/140
[58] Field of Search ................................... 210/724, 725, 210/726, 727, 728, 912; 423/140; 75/713

[56] References Cited

U.S. PATENT DOCUMENTS

| | | | |
|---|---|---|---|
| 4,155,847 | 5/1979 | Tanaka et al. ............................. | 210/54 |
| 4,744,825 | 5/1988 | Chen et al. ............................... | 75/108 |
| 4,752,397 | 6/1988 | Sood ........................................ | 21/662 |
| 5,055,199 | 10/1991 | O'Neill et al. ........................... | 210/684 |
| 5,227,020 | 7/1993 | Endres et al. ............................. | 162/8 |
| 5,549,820 | 8/1996 | Bober et al. ............................. | 210/199 |

FOREIGN PATENT DOCUMENTS

| | | |
|---|---|---|
| 0 369 275 | 11/1988 | European Pat. Off. . |
| 51-99854 | 3/1976 | Japan . |
| 92/11213 | 7/1992 | WIPO . |

OTHER PUBLICATIONS

Research Disclosure, vol. 134, No. 54, Jun. 1975, pp. 46–47, entitled Method for Recovery and Reuse of Iron Cyanides Used in Photographic Processing.

*Primary Examiner*—Peter A. Hruskoci
*Attorney, Agent, or Firm*—J. Lanny Tucker; J. Richard Everett

[57] ABSTRACT

The present invention concerns the treatment of an aqueous effluent and consists of ridding it of the iron which it contains, notably in the form of a complex. The method according to the invention consists of treating this effluent by successively a silicate, and a magnesium and aluminium hydroxycarbonate, then decanting and filtering. The method according to the invention is particularly useful in the treatment of photographic effluents.

7 Claims, 1 Drawing Sheet

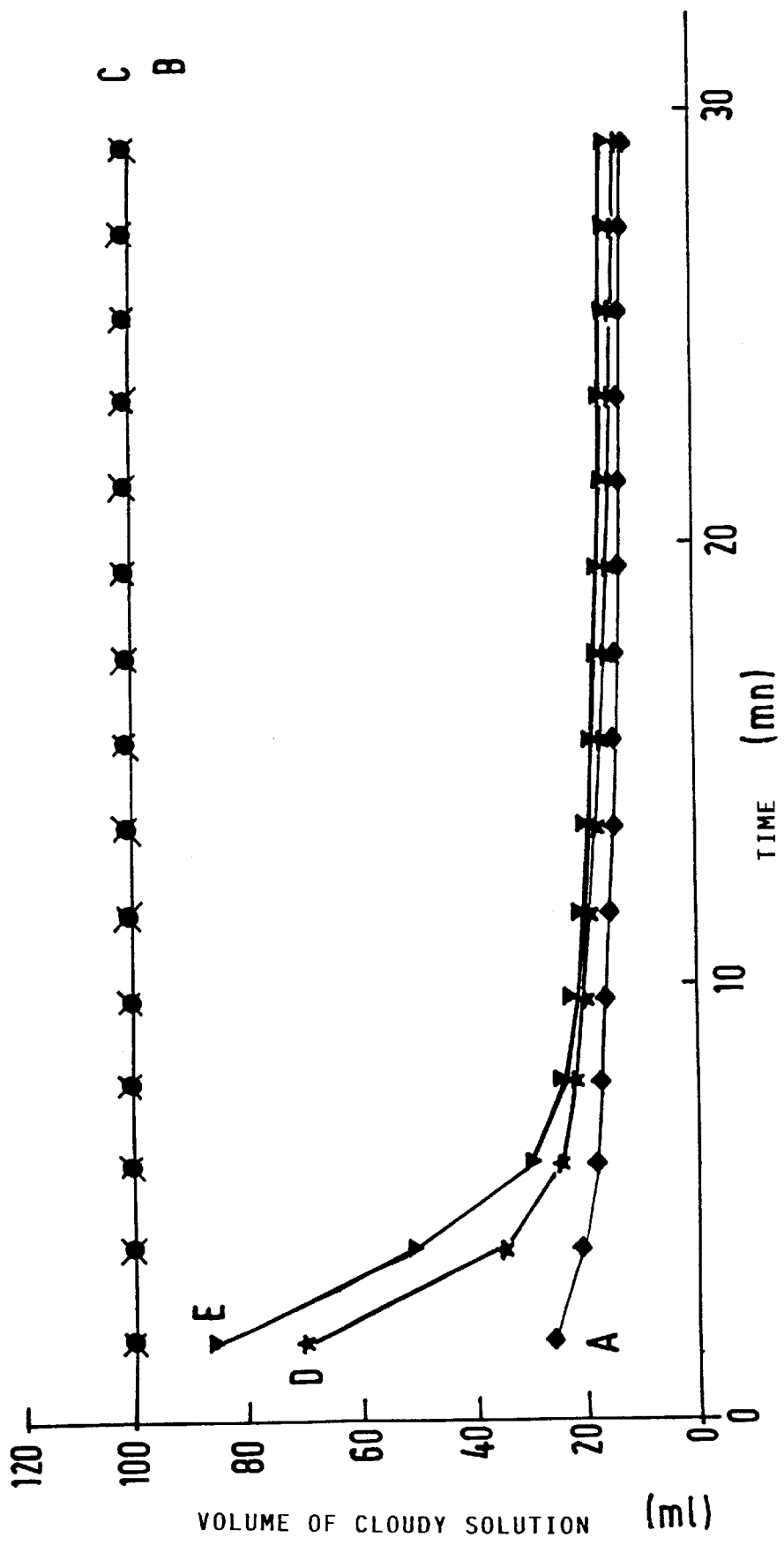

METHOD FOR ELIMINATING IRON FROM A PHOTOGRAPHIC EFFLUENT

The present invention concerns the treatment of aqueous effluents containing iron, for the elimination of this metal.

Iron is present, sometimes in large quantities, in numerous effluents and, in particular, in photographic effluents given that the bleaching agent during photographic processing is almost always a ferric complex used in a quantity of several g/l.

The elimination of heavy metals in effluents before their disposal to the sewage plant is becoming a necessity in order to satisfy the standards for waste laid down for better protection of the environment. Iron is one of the metals envisaged by these standards. Various techniques have been described for the elimination of iron. Precipitation in the form of hydroxide, by means of soda or lime, remains the most common technique. This technique uses thickeners such as silicates, and/or flocculents, in addition to alkali. It is suited to effluents whose iron concentration is high (60–70 g/l). It is certain that the use of high quantities of alkalis can represent a drawback. A precipitation technique is for example described by R N Kust in "Residues Effluents Process Environ. Consid.", Proc. Int. Symp., 793–800, 1992.

According to another technique, a biological treatment of the effluent takes place, notably when the iron concentration is lower (between 5 and 50 mg/l). Bacteria, or a source of bacteria, are used. Such a technique is described by D Couillard and G Mercier in "Water Research", 27, (7) 1227–1235 (1993). In order to eliminate iron, the use of ion exchange resins or zeolites has also been described, but this technique appears to be applicable only to effluents which contain only small quantities of iron. Furthermore, saturation of the resin or zeolite occurs rapidly. Finally, zeolite can, apart from iron, adsorb organic substances which contribute to a reduction in its efficacy. Treatment by zeolite is described by J E Garcia Hermandez et al in "Environ. Pollut.", 76 (3), 219–223 (1992) and treatment by resins is described by M Diaz et al in "J. Metall" 39 (7) 42–44 (1987).

An aluminium and magnesium hydroxycarbonate designated by the name of hydrotalcite, existing in the natural state, but also prepared by synthesis, has been used as an adsorbent in order to extract metallic complexes from aqueous solutions in which they are found.

Sood U.S. Pat. No. 4,752,397 describes a method for purifying an aqueous effluent by passing it through a calcined hydrotalcite. The substances (metallic complexes) adsorbed on the hydrotalcite are then desorbed.

O'Neill et al U.S. Pat. No. 4,867,882 describes a method for eliminating from an aqueous effluent anionic complexes, for example a complex of silver dithiosulphate or copper-EDTA, by passing this effluent over a hydrotalcite.

Conventionally, hydrotalcite is used in the form of a fine powder, the elimination of which by decanting and filtration is difficult.

The object of the present invention is a method using hydrotalcite to treat an effluent in order to rid it of the iron which it contains, notably in the form of a complex, while improving the stages of decanting and filtration. This method lowers the concentration of iron to values below 5 ppm.

The method according to the invention for recovering the iron in an effluent resulting from a photographic process comprises the steps of:

(a) treating this effluent in sequence by:
(i) a silicate
(ii) a hydrotalcite, then (b) decanting and
(c) filtering.

This method can also use a flocculent or a combination $Ca(OH)_2$/a base/a flocculent; according to a particular embodiment, the method comprises the steps of:

(a) treating the effluent in sequence by:
(i) a silicate,
(ii) $Ca(OH)_2$,
(iii) a hydrotalcite,
(iv) a base and,
(v) a flocculent, (b) decanting and
(c) filtering.

The silicate used according to the method of the invention is a silicate of an alkali metal, for example sodium silicate.

The flocculent used according to the method of the invention can be of the organic or inorganic type, or a derivative of a natural product.

In the present specification, the terms "photographic process" designate the conventional sequence of steps for processing exposed photographjic materials, i.e. development, fix, bleach or bleach-fix.

According to the present invention, useful organic flocculents comprise, for example, poly(ethyleneamine), poly[N-(dimethylaminoethyl)acrylamide], poly(2-vinylimidazolium polybisulphate), poly(diallyldimethylammonium chloride), poly(N,N-dimethylaminoethyl methacrylate), poly[N-(dimethylaminopropyl)methacrylamide], sodium polyacrylate, ammonium polyacrylate, sodium polystyrene sulphonate, polyacrylamide, ethylene polyoxide, polyvinylpyrrolidone.

According to the present invention, useful inorganic flocculents comprise, for example, alums $[Al_2(SO_5)_{3-x}H_2O;$ with $x \cong 14]$, aluminium polychloride, sodium aluminate, iron trichloride, calcium oxide, diferro tris(sulphate) heptahydrate, iron sulphate heptahydrate, a mixture based on CaO and MgO, calcium hydroxide, a $Ca(OH)_2$/MgO mixture, a $Ca(OH)_2$/$Mg(OH)_2$ mixture, bentonite and magnesium bicarbonate.

According to the present invention, useful flocculents derived from natural products are, for example, starch, guar gum, chitosan, gelatine, alginic acid, sodium alginate, sodium carboxymethylcellulose, xanthan, tannins and dextran.

According to the present invention, the base can be of the organic or inorganic type and must enable the pH of the effluent to be treated to be adjusted to values between 8 and 12 and preferably between 9 and 10.

The hydrotalcite used by the said method can be either of natural origin, or prepared by means of chemical synthesis. Hydrotalcite can be represented by the general formula:

$$[M(II)_{1-x}M(III)_x(OH)_2]x+[A^{n-}x/n].^{mH2O}.$$

with
  M(II)=divalent metallic cation
  M(III)=trivalent metallic cation
  A=anion (mono, di, tri or tetravalent) and $0.1 < x < 0.5$ and $m < 1$
and, for example,
  M(II)=$Mg^{2+}$, $Ni^{2+}$, $Fe^{2+}$, $Co^{2+}$, $Cu^{2+}$, $Li^{2+}$, $Zn^{2+}$, $Mn^{2+}$;
  M(III)=$Al^{3+}$, $Fe^{3+}$, $Cr^{3+}$, $Mn^{3+}$, $Ni^{3+}$;
  A=$F^-$, $Cl^-$, $Br^-$, $I^-$, $(ClO_4)^-$, $(NO_3)^-$, 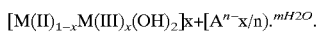 $(IO_3)^-$, $OH^-$, $(CO_3)^{2-}$, $(SO_4)^{2-}$, $(S_2O_3)^{2-}$, $(WO_4)^{2-}$, $(CrO_4)^{2-}$, $[Fe(CN)_6]^{3-}$, $[Fe(CN)_6]^{4-}$, $[SiO(OH)_3]^-$, $(PMo_{12}O_{40})^{3-}$, $(PW_{12}O_{40})^{3-}$, derivatives of the arylsulphonate type, $[Ru(4,7$-diphenyl-1,10-phenanthrolinedisulphonate$)_3]^{4-}$, $(Mg_2Al(OH)_6)^+ \cdot [Mg_3(OH)_2/Si_3AlO_{10}]^-$ and anions of organic acids such as adipic, oxalic, succinic, malonic, sebacic 1,12-, dodecanedicarboxylic, acylsulphonate and chlorocinnamic.

The present invention can be illustrated by the following examples.

EXAMPLES

1—Preparation of hydrotalcite a) A solution A is prepared by dissolving 306 g of $Mg(NO_3)_2 \cdot 6H_2O$ and 112.5 g of $Al(NO_3)_3 \cdot 9H_2O$ in 690 ml of osmosed water. A solution B is prepared by adding 99 g of $Na_2CO_3$ and 279 g of soda at 50% to 900 ml of osmosed water.

B) Solutions A and B are added simultaneously in a beaker containing 600 ml of osmosed water, with rates of addition of 15 ml/min and 14.1 ml/min respectively over a period of about one hour. Solution B serves to keep the pH at a value of around 10.

C) After filtration and washing by 4×300 ml of osmosed water, the solid residue is dried for 4 days at 70° C. (weight of dry residue=111 g). The residue is then ground until the desired particle size is obtained.

2—Treatment of a photographic effluent

The effluent treated is a standard effluent resulting from the mixing of used fixing and bleaching solutions which have undergone a electrolysis/ozonisation and development process previously treated by ozonisation. This effluent receives the following treatments (per 100 ml):

TABLE 1

| Treatments | Sodium silicate (μl) | Ca(OH)₂ (mg) | Hydro-talcite | pH | NaOH 50% (mg) | pH adjusted to | Flocculent (ml) |
|---|---|---|---|---|---|---|---|
| A-Invention | 200 | 200 | 100 | 9.1 | 58 | 9.2 | 3 |
| B-Comparison | | | 400 | 8.6 | | | |
| C-Comparison | | | 400 | 8.6 | | | 3 |
| D-Invention | 200 | | 400 | 8.7 | | | |
| E-Invention | 200 | | 400 | 8.7 | | | 3 |

Initial conditions: [total Fe]=552 mg/l; [complexed Fe]=108.1 mg/l: pH=7.6

The flocculent used is Sedipur CF404 (500 mg/l solution). The sodium silicate is supplied by Aldrich. Each treatment is completed with a stage of decanting and filtration.

In order to compare the efficacy of the treatments, the following measurements were taken for 100 ml of effluent;

Determination of decantation time:

Following each treatment, the volume of cloudy solution is measured over time (see FIG. 1).

Determination of iron elimination rates:

The measurements of iron concentrations were determined for each treatment by the coupling induced plasma technique (ICP, model JY70Plus) for the supernatant (the liquid phase obtained following decantation of the solid) and the filtrate (the liquid phase obtained after the filtration stage) and are detailed in Table 2.

Determination of filtration time (see Table 3):

Use of filters with a porosity of 1.2 μm in a vacuum of 20 mm Hg.

TABLE 2

| Treatments | A | B | C | D | E |
|---|---|---|---|---|---|
| [Fe] mg/l supernatant | 19.6 | 72.3 | 132.3 | 27.9 | 29.6 |
| Level of elimination % | 96 | 87 | 76 | 95 | 95 |
| Filtrate [Fe] mg/l | 15.1 | 25.4 | 18.9 | 13.8 | 12.0 |
| Level of elimination | 97 | 95 | 97 | 98 | 98 |

Initial effluent: [total Fe]=552 mg/l; [complexed Fe]=108.1 mg/l

TABLE 3

| Treatments | A-Invent. | B-Compar. | C-Compar. | D-Invent. | E-Invent. |
|---|---|---|---|---|---|
| Filtration time (mins) | 6 | 11.5 | 13 | 6 | 5.5 |

Filtration times for treatments A to E per 100 ml.

DISCUSSION

According to the Figure, it may be noted that the use of hydrotalcite on its own (treatment B, comparison) or in combination with a flocculent (treatment C, comparison) does not afford good decantation since the volume of cloudy solution is still 100 ml after 30 mins. This is verified by the high iron concentration in the supernatant for the comparative treatments B and C (Table 2). The presence of sodium silicate in treatments A, D and E according to the invention improves the speed of decantation since, after 10 mins, the volume of cloudy solution is around 20 ml. A better quality of decantation is obtained for treatments A, D and E (Table 2, invention), this is illustrated by a lower Fe concentration in the supernatant. It will also be noted that the final iron concentration in the filtrate (Table 2) is lower for treatments A, D and E (invention).

According to Table 3, the filtration times for treatments A, D and E (invention) are significantly lower than those of treatments B and C (comparative), which presents a certain advantage for an industrial application.

The invention has been described in detail with particular reference to certain preferred embodiments thereof, but it will be understood that variations and modifications can be effected within the spirit and scope of the invention.

I claim:

1. A method for eliminating iron from an effluent resulting from a photographic process said method comprising the steps of:

(a) treating this effluent by successively a silicate, $Ca(OH)_2$, a magnesium and aluminium hydroxycarbonate (hydrotalcite), a base and a flocculent at a pH between 8 and 12, (b) decanting a supernatent to eliminate iron from the effluent mixture resulting from step (a), and (c) filtering the supernatent to eliminate iron from said supernatant.

2. The method according to claim 1, characterised in that the effluent is a mixture of used developing, fixing and bleaching photographic solutions.

3. Method according to claim 2, characterised in that a quantity of hydrotalcite between 0.5 and 4 g/liter of effluent treated is used.

4. Method according to claim 2, characterised in that between 1 and 5 ml of silicate is used per liter of effluent treated.

5. The method according to claim 1, characterised in that the effluent is treated at a pH between 9 and 10.

6. The method according to claim 1, characterised in that the effluent contains an alkylene amine polycarboxylic acid.

7. The method according to claim 1, characterised in that the silicate is an alkali metal silicate.

* * * * *